(12) United States Patent
Sangermano et al.

(10) Patent No.: US 11,156,153 B2
(45) Date of Patent: Oct. 26, 2021

(54) CLOSED CYCLE COMBUSTION SYSTEM FOR ENDOTHERMIC ENGINES

(71) Applicants: Paolo Sangermano, Rome (IT); Luca Sangermano, Rome (IT); Ferdinando Smorra, Portici (IT)

(72) Inventors: Paolo Sangermano, Rome (IT); Luca Sangermano, Rome (IT); Ferdinando Smorra, Portici (IT)

(*) Notice: Subject to any disclaimer, the term of this patent is extended or adjusted under 35 U.S.C. 154(b) by 2 days.

(21) Appl. No.: 16/771,113

(22) PCT Filed: Dec. 18, 2018

(86) PCT No.: PCT/EP2018/025322
§ 371 (c)(1),
(2) Date: Jun. 9, 2020

(87) PCT Pub. No.: WO2019/120620
PCT Pub. Date: Jun. 27, 2019

(65) Prior Publication Data
US 2020/0300159 A1    Sep. 24, 2020

(30) Foreign Application Priority Data
Dec. 21, 2017  (IT) .................. 102017000147860

(51) Int. Cl.
*F02B 47/10*    (2006.01)
*F02B 51/02*    (2006.01)
(Continued)

(52) U.S. Cl.
CPC ............ *F02B 47/10* (2013.01); *B01D 53/228* (2013.01); *B01D 53/92* (2013.01); *B01D 71/028* (2013.01);
(Continued)

(58) Field of Classification Search
CPC .......... F02B 47/10; F02B 43/10; F02B 51/02; F02B 51/04; F02B 2043/106;
(Continued)

(56) References Cited

U.S. PATENT DOCUMENTS 4,884,531 A * 12/1989 Degnan, Jr. ............. F02B 43/08
123/3
5,307,627 A *  5/1994 Christensen .......... F01N 3/0878
60/274

(Continued)

FOREIGN PATENT DOCUMENTS

DE    3202119 A1    7/1983
NL    9200121 A    8/1993
(Continued)

OTHER PUBLICATIONS

International Search Report and Written Opinion, dated Apr. 8, 2019, from corresponding PCT application No. PCT/EP2018/025322.

*Primary Examiner* — Jacob M Amick
(74) *Attorney, Agent, or Firm* — Nixon & Vanderhye

(57) ABSTRACT

The present invention concerns a closed cycle combustion system for endothermic engines M, comprising: —Means Z for filtering combustion air entering in endothermic engines M; —Means A for molecular re-aggregation of the oxygen supplied by said means Z and entering in endothermic engines M; —Tanks T for fuels or composite mixtures for feeding endothermic engines M; —Means E for producing oxygen and hydrogen; —Means I for the introduction into endothermic engines M of fuels or composite mixtures from tanks T, together with oxygen and hydrogen from said means E; —Means R for exhaust gases recovery released by endothermic engines M and for the partial reintroduction of said exhaust gases into combustion or reaction chambers of said endothermic engines M; —Means RD for cooling the
(Continued)

exhaust gases reintroduced into said combustion or reaction chambers of said endothermic engines M; —Means C1 and C2 for filtering the exhaust gases released from endothermic engines M, and supplied by means R; —Means S for confining the polluting substances obtained from the filtering of said exhaust gases released from said endothermic engines M, supplied by said means R.

13 Claims, 1 Drawing Sheet

(51) Int. Cl.

| | | |
|---|---|---|
| *F02B 51/04* | (2006.01) | |
| *F02M 27/02* | (2006.01) | |
| *F02M 27/04* | (2006.01) | |
| *B01D 53/22* | (2006.01) | |
| *B01D 53/92* | (2006.01) | |
| *F02M 26/00* | (2016.01) | |
| *B01D 71/02* | (2006.01) | |
| *F02B 43/10* | (2006.01) | |
| *F02M 25/12* | (2006.01) | |
| *F02M 35/024* | (2006.01) | |

(52) U.S. Cl.
CPC .............. *F02B 43/10* (2013.01); *F02B 51/02* (2013.01); *F02B 51/04* (2013.01); *F02M 25/12* (2013.01); *F02M 26/00* (2016.02); *F02M 27/02* (2013.01); *F02M 27/04* (2013.01); *F02M 35/024* (2013.01); *F02B 2043/106* (2013.01)

(58) Field of Classification Search
CPC ........ F02M 26/00; F02M 25/12; F02M 27/02; F02M 27/04; F02M 35/024; B01D 53/228; B01D 53/92; B01D 71/028
See application file for complete search history.

(56) References Cited

U.S. PATENT DOCUMENTS

| | | | |
|---|---|---|---|
| 2004/0068987 A1* | 4/2004 | Matsuoka | F02M 21/0206 60/649 |
| 2008/0286165 A1* | 11/2008 | Graupner | C01C 1/08 422/148 |
| 2009/0000586 A1 | 1/2009 | Tonery | |
| 2012/0192834 A1 | 8/2012 | Tonery | |
| 2015/0252757 A1 | 9/2015 | Mcalister | |

FOREIGN PATENT DOCUMENTS

| | | |
|---|---|---|
| WO | 2007/034168 A1 | 3/2007 |
| WO | 2011/007121 A2 | 1/2011 |

\* cited by examiner

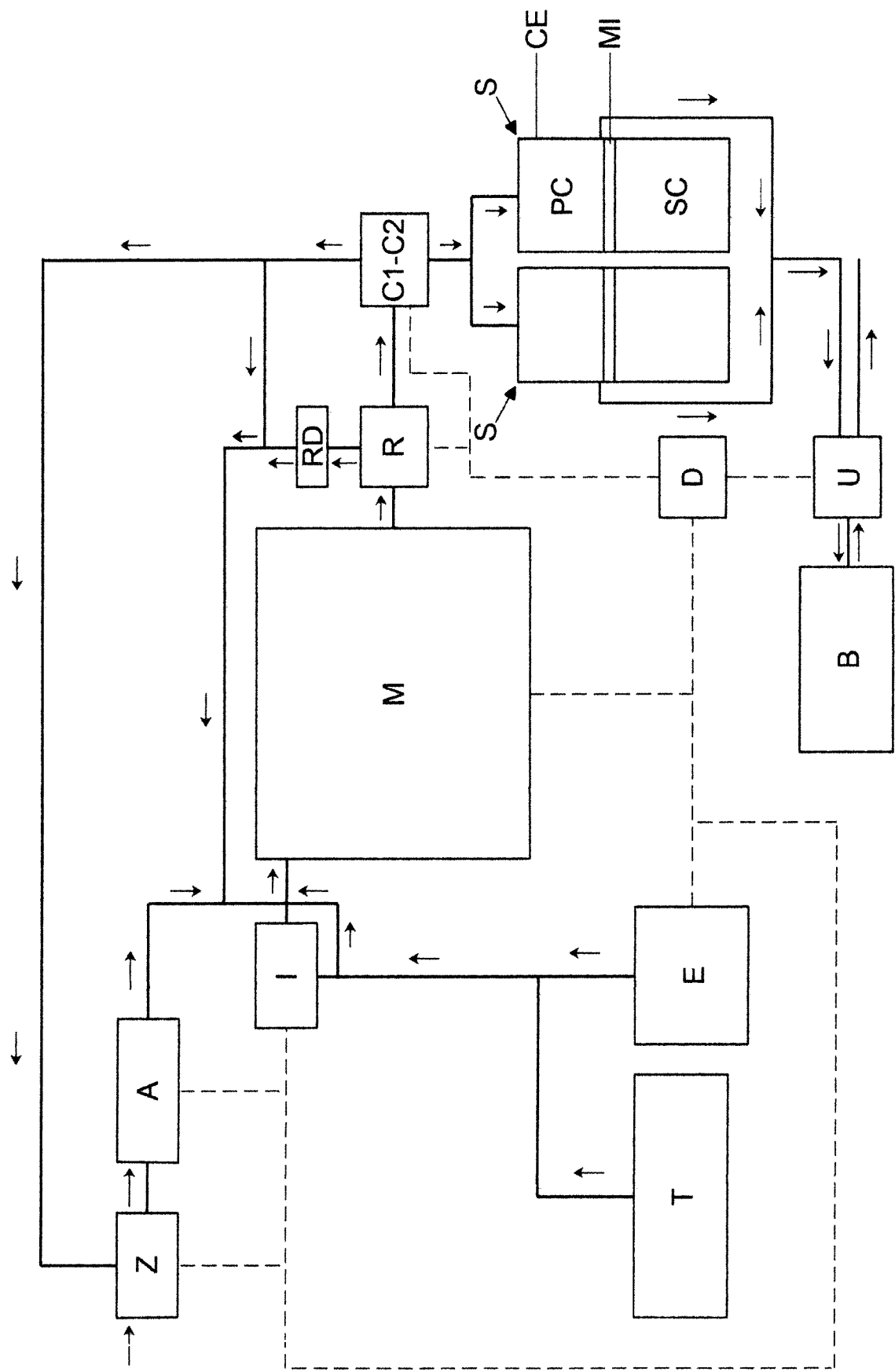

CLOSED CYCLE COMBUSTION SYSTEM FOR ENDOTHERMIC ENGINES

The present invention concerns the technical field of endothermic engines. More in detail, the present invention concerns a closed cycle combustion system for endothermic engines.

In the following specification, the term "endothermic engines" relates to volumetric engines (with alternate or rotary movement) and continuous engines (turbines or reactors) for vehicular, naval, rail or aeronautical propulsion or for industrial use, in particular in the field of energy or thermal production.

The main cause of air pollution actually represented by the exhaust gases of internal combustion engines, widely used in vehicular propulsion and in the energy or thermal generation of industrial processes.

The actual levels of environmental pollution—by now critical—therefore require the introduction of laws that limit the emissions of exhaust gases into the atmosphere and at the same time encourage research and development of solutions alternative to internal combustion engines of the conventional kind.

Electric or hybrid or even recently introduced hydrogen engines have only partially solved above mentioned problems, providing substantial exhaust gas reduction at the expense of the powers supplied and consequently of the overall yields provided.

It is the aim of the present invention to overcome above mentioned problems by the realization of a closed cycle combustion system for endothermic engines, that may assure minimal or nearly zero exhaust gases emissions into the atmosphere and at the same time high efficiency and performance levels in endothermic engines.

The aim set forth in the present invention is obtained by means of a closed cycle combustion system for endothermic engines according to the first independent claim. Further features of the object of the present invention are described in the dependent claims.

The advantages obtained by means of the present invention are the following:

- It allows to increase the overall efficiency and performance of endothermic engines by means of a filtering treatment and a following electromagnetic treatment of molecular re-aggregation of the combustion air entering said engines;
- It allows to reduce the exhaust gases released into the atmosphere by endothermic engines and to further increase the overall efficiency and performance of said engines, by means of partial re-use of the exhaust gases in the combustion processes in the engines themselves;
- It allows to reduce the exhaust gases released in the atmosphere by endothermic engines by means of a physical-chemical filtering treatment of said exhaust gases and successive confinement of the post-combustion polluting substances contained therein;
- It allows to reduce the fuel consumption of endothermic engines by means of a treatment for enriching the fuels with hydrogen and oxygen produced by the system itself.

Further features and advantages of the system according to the present invention will be more evident from the detailed specification hereinbelow relating to the enclosed drawings in which a preferred embodiment is shown for exemplifying and not limiting purposes, in which:

FIG. 1 shows a scheme of the structure and the general working principle of a closed cycle combustion system for endothermic engines according to the present invention.

Relating to the details of FIG. 1, a closed cycle combustion system for endothermic engines M according to the present invention comprises:

- Means Z for filtering combustion air entering in endothermic engines M, that will determine the which will determine the cleavage in inert nitrogen and oxygen;
- Means A for molecular re-aggregation of the oxygen supplied by said means Z and for introduction of said oxygen into endothermic engines M;
- Tanks T for fuels or composite mixtures for feeding endothermic engines;
- Means E for producing oxygen and hydrogen;
- Means I for the controlled introduction into endothermic engines M of fuels or composite mixtures from tanks T, together with oxygen and hydrogen from said means E;
- Means R for exhaust gases recovery released by endothermic engines M and for the partial reintroduction of said exhaust gases into said engines;
- Means RD for cooling the exhaust gases reintroduced into endothermic engines M from means R;
- Means C1 for filtering the exhaust gases released from endothermic engines M, for determining the cleavage thereof into molecular oxygen, unburnt hydrocarbons, carbon dioxide and carbon monoxide;
- Means C2, alternative to means C1, for filtering the exhaust gases released from endothermic engines M for determining the cleavage into organic carbon, heavy hydrocarbons and methanol;
- Means S for confining carbon dioxide and carbon monoxide from means C1 or alternatively of organic carbon, heavy hydrocarbons and methanol coming from said means C2;
- An electronic control unit D for the control and coordination of above mentioned means.

Means Z comprise first filters with zeolite membranes for determining the cleavage of the burning air entering in said endothermic engines M into inert nitrogen and oxygen, the discharge of inert nitrogen into the atmosphere and the inlet of oxygen only into said engines M.

Means A comprise electromagnetic field generators for inducing into the oxygen supplied by means Z, molecular re-aggregations such as to increase the basic stoichiometry and consequently enhance combustion processes fed by it.

Means E comprise high efficiency electrolytic cells for the production of oxygen and hydrogen.

Means I comprise injection valves with digital or electronic control or injection pumps with electronic or electromechanical control.

Means R comprise deviation valves with digital, electronic or electromechanical control.

Means RD comprise gas or liquid radiators or heat exchangers.

Means C1 comprise second filters with zeolite membranes for determining the cleavage of the exhaust gases released from endothermic engines M supplied by said means R, into molecular oxygen, unburnt hydrocarbons, carbon dioxide and carbon monoxide, and furthermore the re-introduction of molecular oxygen into said means Z, A and of unburnt hydrocarbons into endothermic engines M and to lead carbon dioxide and carbon monoxide into said means S.

Means C2 comprise third filters with zeolite membranes, immersed in a bubbling fluid comprising at least water, containing a catalyst in solution comprising at least calcium molecules for determining the cleavage of the exhaust gases released from endothermic engines M supplied by means R, into organic carbon, heavy hydrocarbons and methanol, and also the leading of said substances towards means S.

Means S comprise:
Airtight containers CE comprising watertight membranes MI that determine an internal partition into first and second chambers PC, SC whereby the first are communicating with said means C1 or C2 and with storage cylinders B, and the second chambers carrying the watertight membranes MI;
valves U for reversible load or storage cylinders B, associated to said first chambers PC of said airtight containers CE;
Storage cylinders B for carbon dioxide and carbon monoxide supplied by said means C1, or alternately or organic carbon, heavy hydrocarbons and methanol, supplied by means C2.

The system according to the present invention allows to obtain minimum or almost zero emissions of exhaust gases into the atmosphere and at the same time high efficiency and performance levels in endothermic engines M.

Relating to the details of FIG. 1, the working principle of a closed cycle combustion system for endothermic engines M according to the present invention may be resumed as described hereinbelow.

The starting of engine M determines the activation of means Z, A with consequent aspiration of burning air from the outside, and of means E, with consequent production of oxygen and hydrogen.

Means Z filter the burning air entering into engine M so as to determine the cleavage into inert nitrogen and oxygen and consequently the release of inert nitrogen into the atmosphere and the entering of oxygen only into said engine M by means of first filters with zeolite membranes.

Means A re-assemble the oxygen coming from means Z in molecular structures such as to increase the basic stoichiometry and consequently to increase the combustion in the combustion or reaction chamber of engine M, by mans of electromagnetic fields generators.

Means I addition the fuels or the composite mixtures from tanks T with oxygen and hydrogen from means E and determine the entering thereof into the combustion or reaction chamber of engine M by means of injection valves or pumps, together with the re-aggregated oxygen introduced by said means A into said combustion or reaction chamber of said engine M.

Interacting with the fuels or the composite mixtures enriched with hydrogen and oxygen, the re-aggregated oxygen determines an advantageous enhancement of the combustion in the combustion or reaction chamber of engine M, an advantageous enhancement of the total yield of said engine M and an advantageous consumption reduction of said fuels or composite mixtures.

Means R recover part of the exhaust gases released from engine M and determine the re-introduction thereof into the relative combustion or reaction chamber by means of deviation valves so as to allow to use it in the combustion in said combustion or reaction chamber of said engine M.

Means RD cool the exhaust gases released from means R before their re-introduction into the combustion or reaction chamber of engine M, by means of radiators or heat exchangers.

The cooling of the exhaust gases reintroduced into the combustion or reaction chamber of engine M allows to manage the internal temperature and consequently to determine an advantageous increase in the overall efficiency of the combustion in said combustion or reaction chamber of said engine M.

Means C1 split the remaining exhaust gases supplied by means R into molecular oxygen, unburnt hydrocarbons, carbon dioxide and carbon monoxide by means of second filters with zeolite membranes, and they also:
Lead molecular oxygen towards means Z, A so as to allow the filtering thereof and the re-aggregation and the successive reintroduction into the combustion or reaction chamber of engine M;
Reintroduce the unburnt hydrocarbons into the combustion or reaction chamber of engine M;
Lead carbon dioxide and carbon monoxide towards means S.

Means S receive carbon dioxide and carbon monoxide, supplied from means C1, in the first chambers PC of the relative airtight containers CE so as to determine the compression and the contemporary cooling of carbon dioxide close to the watertight membranes MI of second chambers SC so as to obtain the passage from the gaseous to the liquid state.

After the passage to the liquid state, special valves U for reversible load provide the transfer of the liquid carbon dioxide contained in the first chambers PC of said containers CE into special storage cylinders B together with the carbon monoxide also contained in said first chambers PC of said containers CE.

Instead means C2, that may be inserted into the system alternately to means C1, split the residual exhaust gases supplied by means R into organic carbon, heavy hydrocarbons and methanol determining the filtering thereof by means of third filters with zeolites and a contemporary bubbling in a liquid comprising at least water, containing a catalyst in solution comprising at leans calcium molecules, according to the principles of synthesis of mono and polyvalent alcohols and hydrocarbons known in the scientific literature (Giulio Natta, "La Chimica e l'Industria", yean XXIV, November 1942, page 389).

Now means C2 lead the organic carbon, the heavy hydrocarbons and methanol towards means S.

Means S receive organic carbon, unburnt hydrocarbons and methanol supplied by means C2 in the first chambers PC of the relative airtight containers CE so as to obtain their filling close to watertight membranes MI of the second chambers SC.

When the first chambers PC are filled, special valves U for reversible load will transfer the organic carbon, the unburnt hydrocarbons and the methanol contained in the first chambers PC of said containers CE into special storage cylinders B.

This means that means C1 and C2 are able to prevent the emission into the atmosphere of the most polluting substances contained in the exhaust gases released from the combustion that takes place in the combustion or reaction chamber of said engine M as well as a contemporary confinement in special storage cylinders B so as to allow the disposal in suitable installations, the release in controlled environments or the re-use thereof in industrial processes.

An electronic control unit D determines the coordinate functioning of above mentioned means thus allowing the setting of the parameters and of the combustion temperature in said combustion or reaction chamber of said engine M, as well as the setting of the doses of the substances implied in said combustion.

The invention claimed is:

1. A closed cycle combustion system for endothermic engines (M), characterized in that it comprises:
   means (Z) for filtering combustion air entering in endothermic engines (M);
   means (A) for molecular reassembling of the oxygen entering endothermic engines (M), supplied by means (Z);
   tanks (T) for fuel or composite mixtures for feeding endothermic engines (M);
   means (E) for producing oxygen and hydrogen;
   means (I) for introducing fuel or composite mixtures, supplied by tanks (T), into endothermic engines (M), together with oxygen and hydrogen supplied by means (E);
   means (R) for exhaust gas recovery coming out from endothermic engines (M) and partial reintroduction of said exhaust gases in combustion or reaction chambers of said endothermic engines (M);
   means (RD) for cooling the exhaust gases reintroduced in said combustion or reaction chambers of said endothermic engines (M);
   means (C1) or (C2) for filtering the exhaust gases coming out of endothermic engines (M), supplied by means (R);
   means (S) for confining polluting substances obtained by the filtering of said exhaust gases coming out from said endothermic engines (M), supplied by said means (R).

2. A system according to claim 1, characterized in that said means (Z) comprise first filters with zeolite membranes for determining the splitting of the burning air entering endothermic engines (M) into inert nitrogen and oxygen, the discharge of inert nitrogen into the atmosphere and the inlet of oxygen only into said endothermic engines (M).

3. A system according to claim 1, characterized in that said means (A) comprise electromagnetic fields generators for reassembling the oxygen supplied by means (Z) into molecular structures such as to increase the basic stoichiometry.

4. A system according to claim 1, characterized in that means (I) comprise injection valves with digital or electronic control or injection pumps with electronic or electromechanical control.

5. A system according to claim 1, characterized in that means® comprise deviation valves with digital, electronic or electromechanical control.

6. A system according to claim 1, characterized in that means (RD) comprise gas or liquid radiators or heat exchangers.

7. A system according to claim 1, characterized in that means (C1) comprise second filters with zeolite membranes for determining the splitting of the exhaust gases coming out from endothermic engines (M) supplied by means (R), into molecular oxygen, unburnt hydrocarbons, carbon dioxide and carbon monoxide.

8. A system according to claim 7, characterized in that means (C1) are further able to lead molecular oxygen towards said means (Z, A), to reintroduce unburnt hydrocarbons into combustion or reaction chambers of endothermic engines (M), and to lead carbon dioxide and carbon monoxide towards means (S).

9. A system according to claim 1, characterized in that means (C2) comprise third filters with zeolite membranes for determining the splitting of the exhaust gases coming out from endothermic engines (M) supplied by means (R), into organic coal, heavy hydrocarbons and methanol.

10. A system according to claim 9, characterized in that said third filters with zeolite membranes are immersed in a bubbling liquid comprising at least water containing a catalyst in solution comprising at least calcium molecules.

11. A system according to claim 9, characterized in that means (C2) are further able to lead organic coal, heavy hydrocarbons and methanol towards means (S).

12. A system according to claim 9, characterized in that said means (S) comprise:
   airtight containers (CE) comprising watertight membranes (MI) for determining an internal division into first and second chambers (PC, SC), whereby the first are communicating with means (C1) or (C2) and with storage cylinders (B), and the second are carrying the watertight membranes (MI);
   valves (U) for reversible load of storage cylinders (B), associated to said first chambers (PC) of said airtight containers (CE);
   storage cylinders (B) for carbon dioxide and carbon monoxide supplied by means (C1) or, as an alternative, of organic coal, heavy hydrocarbons and methanol, supplied by means (C2).

13. A system according to claim 1, characterized in that it comprises an electronic control unit (D) for determining the coordinate functioning of the elements of the system, the setting of the operating parameters, the setting of the parameters and of the temperatures of the combustion processes started in combustion or reaction chambers of endothermic engines (M), the dose setting of substances implied in said combustion processes.

* * * * *